(12) United States Patent
McCutchen

(10) Patent No.: US 8,475,616 B2
(45) Date of Patent: Jul. 2, 2013

(54) REACTORS FOR FORMING FOAM MATERIALS FROM HIGH INTERNAL PHASE EMULSIONS, METHODS OF FORMING FOAM MATERIALS AND CONDUCTIVE NANOSTRUCTURES THEREIN

(75) Inventor: Wilmot H. McCutchen, Portland, OR (US)

(73) Assignee: McCutchen Co., Portland, OR (US)

( * ) Notice: Subject to any disclaimer, the term of this patent is extended or adjusted under 35 U.S.C. 154(b) by 355 days.

(21) Appl. No.: 12/794,693

(22) Filed: Jun. 4, 2010

(65) Prior Publication Data

US 2010/0307665 A1 Dec. 9, 2010

Related U.S. Application Data

(60) Provisional application No. 61/184,666, filed on Jun. 5, 2009.

(51) Int. Cl.
*B65H 69/02* (2006.01)
*C08J 9/00* (2006.01)

(52) U.S. Cl.
USPC ............ 156/158; 422/133; 521/50; 521/50.5; 977/742; 977/762; 977/842; 977/901

(58) Field of Classification Search
USPC ............ 156/158; 313/501; 422/133; 427/74, 427/582; 521/50, 50.5; 977/742, 762, 842, 977/901
See application file for complete search history.

(56) References Cited

U.S. PATENT DOCUMENTS

| 512,340 A | 1/1894 | Tesla |
| 2,604,665 A | 7/1952 | Bosomworth et al. |

(Continued)

FOREIGN PATENT DOCUMENTS

WO 2009013500 1/2009

OTHER PUBLICATIONS

Y. Shiratori, H. Hiraoka, M. Yamamoto, Vertically aligned carbon nanotubes produced by radio-frequency plasma-enhanced chemical vapor deposition at low temperature and their growth mechanism, Materials Chemistry and Physics 87 (2004) 31-38,© 2004 Elsevier B.V. All rights reserved.*

(Continued)

*Primary Examiner* — Bijan Ahvazi
(74) *Attorney, Agent, or Firm* — Marger Johnson & McCollom, P.S.

(57) ABSTRACT

An RF inductor such as a Tesla antenna splices nanotube ends together to form a nanostructure in a polymer foam matrix. High Internal Phase Emulsion (HIPE) is gently sheared and stretched in a reactor comprising opposed coaxial counter-rotating impellers, which parallel-align polymer chains and also carbon nanotubes mixed with the oil phase. Stretching and forced convection prevent the auto-acceleration effect. Batch and continuous processes are disclosed. In the batch process, a fractal radial array of coherent vortices in the HIPE is preserved when the HIPE polymerizes, and helical nanostructures around these vortices are spliced by microhammering into longer helices. A disk radial filter produced by the batch process has improved radial flux from edge to center due to its area-preserving radial vascular network. In the continuous process, strips of HIPE are pulled from the periphery of the reactor continuously and post-treated by an RF inductor to produce cured conductive foam.

10 Claims, 8 Drawing Sheets

U.S. PATENT DOCUMENTS

| | | |
|---|---|---|
| 6,204,298 B1 | 3/2001 | DesMarais et al. |
| 6,265,466 B1 | 7/2001 | Glatkowski et al. |
| 6,331,265 B1 | 12/2001 | Dupire et al. |
| 6,444,716 B1 | 9/2002 | Hird et al. |
| 6,525,106 B1 | 2/2003 | DesMarais et al. |
| 6,790,425 B1 | 9/2004 | Smalley et al. |
| 6,890,963 B2 | 5/2005 | Clear et al. |
| 7,628,041 B2 | 12/2009 | Greywall |
| 7,704,480 B2 | 4/2010 | Jiang et al. |
| 2002/0088938 A1 | 7/2002 | Colbert et al. |
| 2002/0123283 A1 | 9/2002 | Dyer et al. |
| 2004/0087926 A1 | 5/2004 | Ko et al. |
| 2006/0092370 A1* | 5/2006 | Lu ................................ 349/183 |
| 2008/0191606 A1* | 8/2008 | Geohegan et al. ............ 313/501 |
| 2010/0099782 A1 | 4/2010 | Lee et al. |

OTHER PUBLICATIONS

International Search Report dated Jan. 12, 2011 corresponding to International Application No. PCT/US2010/037537 filed Jun. 4, 2010.

Burghelea et al, "Elastic turbulence in von Karman swirling flow between two disks", arXiv:physics/0609112v1 [physics.flu-dyn], Sep. 13, 2006, pp. 1-31.

Chen et al., "Fractal-like tree networks increasing the permeability", Physical Review E 75, 056301 (2007), pp. 1-8.

Lee, "Emulsion rheology and properties of polymerized high internal phase emulsions", Korea-Australia Rheology Journal, vol. 18, No. 4, Dec. 2006, pp. 183-189.

"Polymer Science and Engineering: The Shifting Research Frontiers", National Academy Press (1994), p. 80.

* cited by examiner

Prior Art
Tesla antenna

Aggregation of Nanotubes under RF Inductor

REACTORS FOR FORMING FOAM MATERIALS FROM HIGH INTERNAL PHASE EMULSIONS, METHODS OF FORMING FOAM MATERIALS AND CONDUCTIVE NANOSTRUCTURES THEREIN

CROSS-REFERENCE TO RELATED APPLICATIONS

This application claims the benefit of U.S. Provisional Application No. 61/184,666 filed Jun. 5, 2009. A related pending application is U.S. application Ser. No. 11/893,454 filed Aug. 16, 2007, the disclosure of which is incorporated herein by reference in its entirety.

BACKGROUND

1. Technical Field

This disclosure relates to continuous and batch manufacture of polymer emulsions such as HIPE and to use of electrical or wave energy in the RF range during the cell forming process or in physical after-treatment of a cellular product. It also relates to polycomposite polymer foams (such as, for example, carbon nanotubes in styrene or ABS monomer becoming a nanocomposite upon polymerization) and to methods of improving the strength and conductivity of polycomposite foams by linking conductive particles included therein (such as, for example, carbon nanotubes in styrene or ABS polymer) into nanostructure which increases bulk conductivity.

2. Discussion of the Related Art

High Internal Phase Emulsion (HIPE) foam is made from a polymer emulsion comprising immiscible phases: a continuous phase and an internal phase. The continuous phase is also called the oil phase and the internal phase is also called the aqueous phase, although non-aqueous emulsions comprising immiscible organic compounds are included in this definition.

Curing of an emulsion to produce a stable and solid foam is conventionally done by baking the foam in a curing chamber. Low polymer thermal conductivity frustrates heating the interior of the foam from the outside. Alternatively, ultraviolet (UV) treatment is used. For an excellent review of the field of UV and conventional heat treatment of HIPE foam containing polyelectrolytes, see Clear, et al. U.S. Pat. No. 6,890,963 (2005). RF curing of sponge rubber is disclosed in Bosomworth, et al. U.S. Pat. No. 2,604,665 (1952).

An unsolved problem in the art of HIPE manufacture is the auto-acceleration effect, where localized heat buildup during polymerization causes polymers to ball up and conceal their evolving active ends, which impedes complete monomer-to-polymer conversion and crosslinking of polymers. However, crosslinking of polymers is desirable for durability and stretchability.

Nanocomposite polymer foams, comprising carbon nanotubes, are known to have advantageous properties, such as light weight, conductivity and durability. They offer promise as replacements for conventional conductive materials, such as copper wire. However, carbon nanotubes produced by conventional methods are undesirably short.

Accordingly, a need remains for a process of forming a foam material that avoids the auto-acceleration effect. A need also remains for a process of forming a nanocomposite polymer foam having macroscale nanostructures formed from carbon nanotubes.

SUMMARY

According to some embodiments, a method for forming a polymeric foam can include: axially feeding a high internal phase emulsion (HIPE) including an aqueous phase and an oil phase into a workspace defined between opposed counter-rotating centrifugal impellers having a common axis of rotation; advecting the HIPE in an orthogonal flow within the workspace away from the axis of rotation to a periphery of the workspace; curing the HIPE within the workspace to thereby form a HIPE foam at the periphery of the workspace; and withdrawing the HIPE foam.

According to some embodiments, a method for batch processing of a polymeric material can include axially feeding a high internal phase emulsion (HIPE) comprising an aqueous phase and an oil phase into a workspace defined between opposed counter-rotating centrifugal impellers having a common axis of rotation; generating a low pressure sink region within the HIPE adjacent to an axial extraction port communicating with an axial extraction pump, thereby forming convergent sink flow channels within the HIPE; and advecting the aqueous phase radially inward to the impeller axis of rotation through the convergent sink flow channels.

According to some embodiments, a reactor for polymeric processing includes: opposing coaxial counter-rotatable centrifugal impellers defining between them a workspace; a driver connected to the impellers and configured to cause counter-rotation of the impellers; an axial feed port at the center of one of the impellers, the axial feed port configured to introduce a high internal phase emulsion (HIPE) comprising an aqueous phase and an oil phase into the workspace; and a central port in the other of the impellers for introducing additional aqueous phase into the workspace.

According to some embodiments, a method of forming a nanostructure includes: dispersing nanotubes in a matrix material; and joining ends of the nanotubes together.

Figure 1:
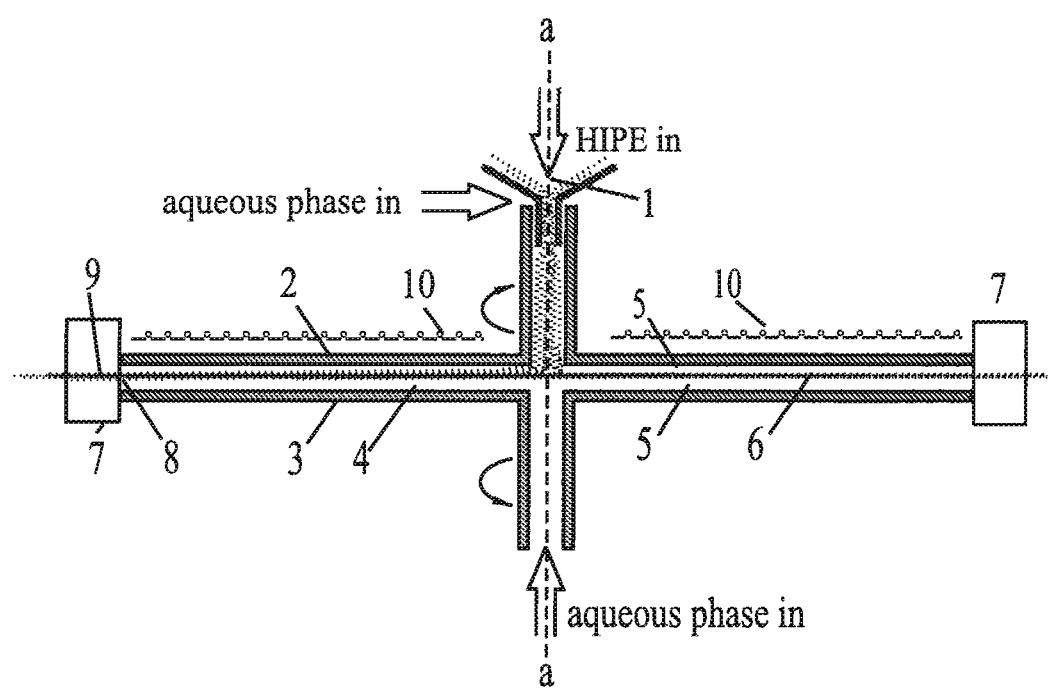
FIG. 1 shows a cross-sectional view of an embodiment of the shear reactor.

DRAWING REFERENCE NUMERALS a-a is the axis of rotation of the impellers and the axis of symmetry of the reactor
1—axial feed port for HIPE
2—top impeller
3—bottom impeller
4—runners on the impellers
5—boundary layer
6—shear layer
7—divider which splits the extruded HIPE into strips
8—periphery of the workspace
9—strip of extracted HIPE
10—inductor
11—aqueous phase port 12—radio frequency electromagnetic source
13—axial extraction port
14—axial extraction pump

DETAILED DESCRIPTION

According to some embodiments, a method for forming a polymeric foam can include: axially feeding a high internal phase emulsion (HIPE) including an aqueous phase and an oil phase into a workspace defined between opposed counter-rotating centrifugal impellers having a common axis of rotation; advecting the HIPE in an orthogonal flow within the workspace away from the axis of rotation to a periphery of the workspace; curing the HIPE within the workspace to thereby form a HIPE foam at the periphery of the workspace; and withdrawing the HIPE foam through the periphery of the workspace.

In one embodiment, the HIPE foam is withdrawn through the periphery of the workspace. In another embodiment, the HIPE can be axially fed into the workspace while the HIPE foam is withdrawn. In another embodiment, however, the HIPE foam can be withdrawn when the HIPE is not axially fed into the workspace.

In one embodiment, the aforementioned method for forming a polymeric foam further includes dividing the HIPE foam into strips. In another embodiment, the HIPE foam is divided into strips while the HIPE foam is withdrawn. In another embodiment, the HIPE foam is withdrawn as a result of the dividing. Thus, the withdrawing of the HIPE foam can include dividing the HIPE foam into strips.

In one embodiment, curing the HIPE includes subjecting the HIPE to an electromagnetic field. In another embodiment, the electromagnetic field is an RF field.

In one embodiment, the aforementioned method for forming a polymeric foam further includes providing a slip layer between the impellers and the HIPE. In another embodiment, the slip layer is provided by adding additional aqueous phase to the workspace. In another embodiment, the composition of the additional aqueous phase is different from the composition of the aqueous phase in the HIPE.

In one embodiment, the oil phase of the HIPE includes conductive particles. In another embodiment, the conductive particles include at least one material selected from the group consisting of carbon, tungsten, boron, silicon, titanium, molybdenum, vanadium, manganese, copper, bismuth, gold, aluminum, silver and cations. In another embodiment, the conductive particles include at least one selected from the group consisting of nanotubes, nanowires, metal powder, and metal flakes. In one embodiment, the nanotubes include at least one material selected from the group consisting of carbon, tungsten, boron, silicon, titanium, molybdenum, vanadium, manganese, copper and bismuth. In one embodiment, the nanowires, metal powder and metal flakes include at least one material selected from the group consisting of carbon, gold, aluminum, and silver.

According to some embodiments, a method for batch processing of a polymeric material can include axially feeding a high internal phase emulsion (HIPE) comprising an aqueous phase and an oil phase into a workspace defined between opposed counter-rotating centrifugal impellers having a common axis of rotation; generating a low pressure sink region within the HIPE adjacent to an axial extraction port communicating with an axial extraction pump, thereby forming convergent sink flow channels within the HIPE; and advecting the aqueous phase radially inward through the convergent sink flow channels.

In one embodiment, the aforementioned method for batch processing of a polymeric material can further include curing the HIPE within the workspace. In one embodiment, curing the HIPE includes subjecting the HIPE to an electromagnetic field. In one embodiment, the electromagnetic field is an RF field.

In one embodiment, the low pressure sink region is generated by removing the aqueous phase from the HIPE through the axial extraction port. In one embodiment, the aqueous phase is advected radially inward through the convergent sink flow channels to the impeller axis of rotation. In one embodiment, the aforementioned method for batch processing of a polymeric material can further include adding additional aqueous phase to the workspace. In another embodiment, the additional aqueous phase may be added as the aqueous phase is removed through the axial extraction port. In one embodiment, the composition of the additional aqueous phase is different from the composition of the aqueous phase in the HIPE.

In one embodiment, the oil phase of the HIPE includes conductive particles. In another embodiment, the conductive particles include at least one material selected from the group consisting of carbon, tungsten, boron, silicon, titanium, molybdenum, vanadium, manganese, copper, bismuth, gold, aluminum, silver and cations. In another embodiment, the conductive particles include at least one selected from the group consisting of nanotubes, nanowires, metal powder, and metal flakes. In one embodiment, the nanotubes include at least one material selected from the group consisting of carbon, tungsten, boron, silicon, titanium, molybdenum, vanadium, manganese, copper and bismuth. In one embodiment, the aforementioned method for batch processing of a polymeric material can further include parallel-aligning the conductive particles into structures within the HIPE. In another embodiment, the structures formed by parallel-aligning the conductive particles within the HIPE are radial helical structures. In another embodiment, the aforementioned method for batch processing of a polymeric material can further include joining the conductive particles of a radial helical structure into a helical nanostructure.

According to some embodiments, a reactor for polymeric processing includes: opposing coaxial counter-rotatable centrifugal impellers defining between them a workspace; a driver operatively connected to the impellers and configured to cause counter-rotation of the impellers; an axial feed port at the center of one of the impellers, the axial feed port configured to introduce a high internal phase emulsion (HIPE) comprising an aqueous phase and an oil phase into the workspace; and a central port in the other of the impellers for introducing additional aqueous phase into the workspace.

In one embodiment, at least one of the impellers is configured to transmit the additional aqueous phase therethrough. In one embodiment, at least one of the impellers includes at least one pore through which the additional aqueous phase may be transmitted. In another embodiment, at least one of the impellers is a porous structure through which the additional phase may be transmitted. In one embodiment, the composition of the additional aqueous phase is different from the composition of the aqueous phase in the HIPE.

According to some embodiments, a method of forming a nanostructure includes: dispersing nanotubes in a matrix material; and joining ends of the nanotubes together.

In one embodiment, ends of the nanotubes together by inducing currents in the nanotubes. In one embodiment, currents are induced by an inductor. In one embodiment, the inductor induces currents by generating an RF field.

In one embodiment, the nanotubes include at least one material selected from the group consisting of carbon, tungsten, boron, silicon, titanium, molybdenum, vanadium, manganese, copper and bismuth.

In one embodiment, the matrix material includes at least one selected from the group consisting of a thermoset polymeric material, a thermoplastic material and a ceramic material.

In one embodiment, the nanotubes comprise carbon nanotubes, the matrix material comprises carbon, and the method of forming a nanostructure further includes electrolytically separating portions of matrix material located between oppositely charged ends of the carbon nanotubes, thereby providing carbon ions for nanotube growth. Carbon nanotubes can be produced by conventional methods, which include arc discharge. So called "arm-chair" carbon nanotubes exhibit metallic properties and are referred to as metallic nanotubes. Carbon nanotubes can also exhibit semiconductive properties. Metallic carbon nanotubes have high electrical conductivity, approaching superconductive. Clusters of nanotubes which are parallel-aligned and held together by van der Waals forces are called "ropes" or "yarn." Linking up such clusters end to end forms a nanostructure. Linking up clusters of carbon nanotubes end-to-end forms a nanostructure. The nanostructure is desirable for increasing structural strength and conductivity of the polycomposite foam.

Specific examples of the embodiments described above will now be described with respect to FIGS. 1 to 8. These examples are intended to be illustrative, and the claims are not limited to the structures, materials, conditions, or process parameters set forth in these examples.

FIG. 1 shows a cross-sectional elevational view of an embodiment of the HIPE shear reactor used for continuous HIPE foam production.

A workspace is defined between approximately parallel opposed coaxial counter-rotatable centrifugal impellers 2, 3. A driver (not shown) can be operatively connected to the impellers 2, 3 and be configured to cause the impellers 2, 3 to counter-rotate. The driver may be configured in any suitable manner known in the art. The workspace has an open periphery 8, such that material from between the impellers 2, 3 may pass out of the reactor. A high internal phase emulsion (HIPE) is fed into the workspace through an axial HIPE feed port 1. The HIPE feed port 1 may be of many designs. Its function is to introduce HIPE from a source (not shown, the source comprising means for connecting with the axial HIPE feed port, also not shown) into the center of the workspace while the impellers are counter-rotating about the axis a-a. Appropriate HIPE feed port designs should be obvious to those of ordinary skill.

The oil phase in a HIPE is a relatively low percentage of its volume compared to the aqueous phase, hence the name "high internal phase emulsion." The resulting foam from HIPE can have a volume percentage of voids as high as 90%. The HIPE comprises substantially water-insoluble fractions including monomers that are to be polymerized to form a sponge-like solid structure. Examples of monomers for polymer emulsions known to the art include polystyrene (sold under the trade name Styrofoam) and acrylonitrile butadiene styrene (ABS), as well as synthetic rubbers. Examples of initiators known to the art are persulfate salts. The aqueous phase may comprise a water-soluble electrolyte, which makes the aqueous phase a conductive fluid. In the emulsion, aqueous phase droplets are dispersed as cells and the oil phase fills the interstices around the droplets (cells) in a sponge-like structure. Phase separation by droplet coalescense is conventionally prevented by a surfactant. Cross-linking and polymerization in the oil phase of the emulsion are promoted by heating, in a process known as curing. After curing, the aqueous phase is removed from the HIPE by suitable means known to the art, and the voids left behind define a microporous low density foam having a high internal surface area.

Extrusion of a HIPE foam 9 from the workspace periphery 8 causes advection of HIPE in orthogonal flow through the workspace away from the axis a-a between laminar boundary layers 5 of aqueous phase which set up against the coaxial counter-rotating centrifugal impellers 2, 3. The boundary layers serve as slip layers so the impellers do not tear the HIPE.

Figure 2:
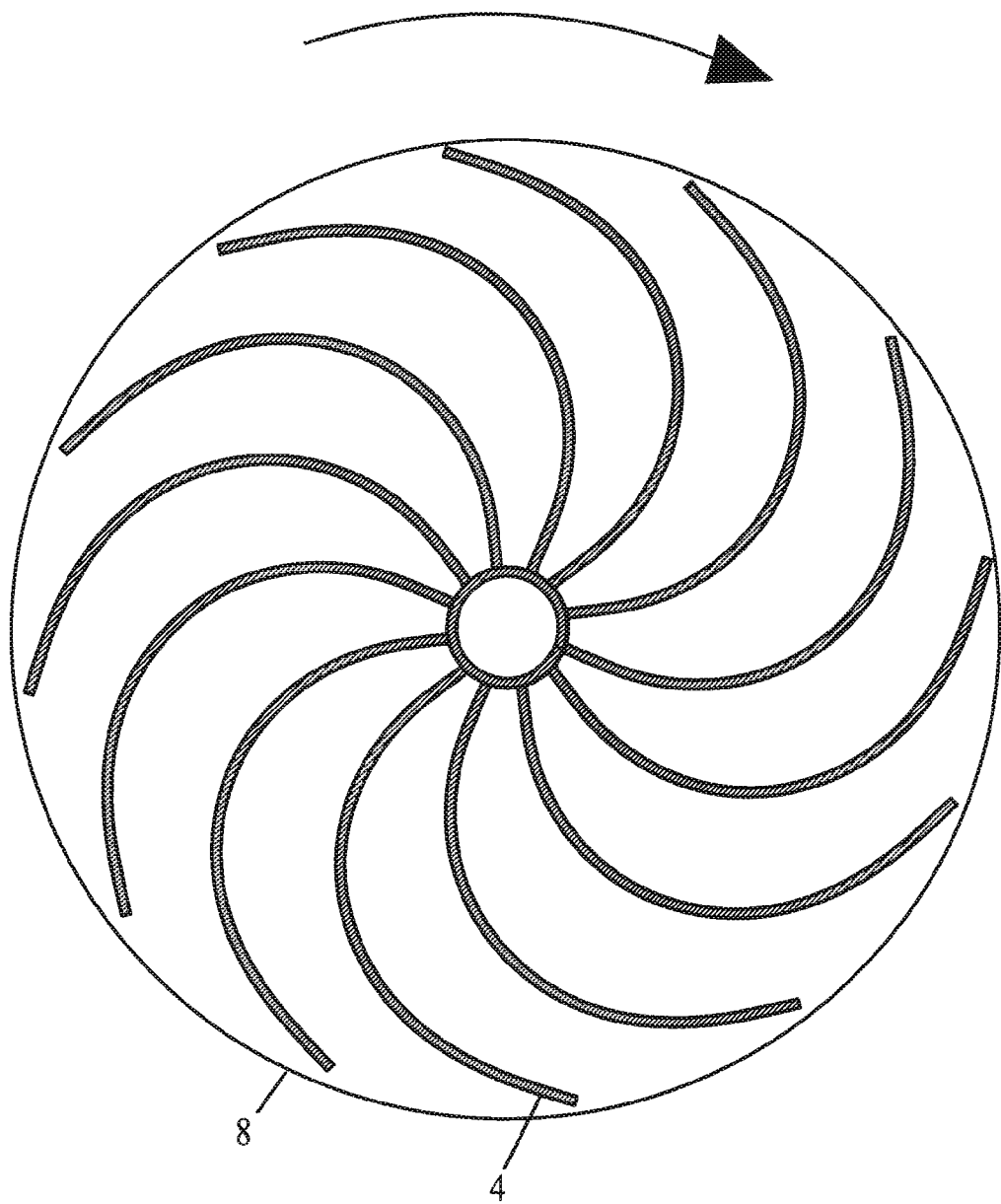
FIG. 2 shows the radial array of runners on the impellers.

The impellers 2, 3 preferably comprise runners 4, in a radial array shown in FIG. 2. The boundary layers 5 are advected radially outward and azimuthally (in opposite directions about the axis a-a) by the impellers. Radially outward flow of aqueous phase is between the runners 4. The rivers of aqueous phase between the runners transport heat out of the HIPE as it cures.

Figure 8:
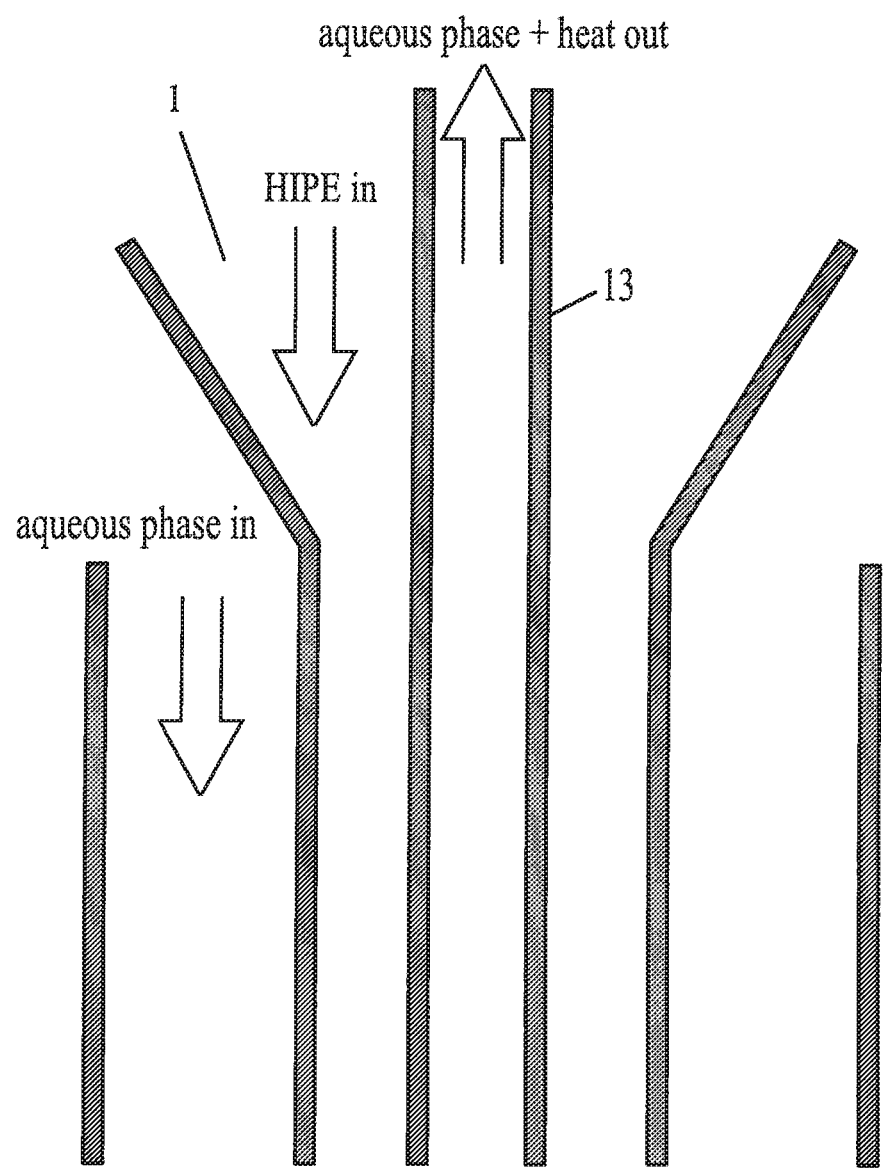
FIG. 8 shows a detail of the structure at the axial feed port in the alternative embodiment shown in FIG. 7.

A HIPE, which may be pre-mixed by suitable means known to the art, is fed into the workspace between the impellers at their common axis of rotation a-a through the axial HIPE feed port 1. Aqueous phase is fed into the reactor through the axial feed port (e.g., around the feed of HIPE) and also through an aqueous phase port 11, as shown in FIG. 1 such that a slip layer of aqueous phase separates the HIPE from contact with the impellers. FIG. 8 shows more detail of the feed of aqueous phase around the feed of HIPE.

The HIPE is stretched by the action of the impellers radially outward and also side-to-side. Active polymer ends do not ball up but continue to scavenge agitated monomers for complete monomer-to-polymer conversion. Stretching also serves to parallel-align polymer chains as well as carbon nanotubes or other high aspect ratio constituents. Parallel-aligned polymer chains are more likely to cross-link, and parallel-aligned carbon nanotubes are more likely to bond by van der Waals forces into a rope or yarn. Tension in the HIPE dissipates elastic stresses present from prior processing, which might give unwanted curliness to the polymer fibers, and keeps the polymers stretched out approximately parallel to each other so as to promote their cross-linking and prevent their balling up into hard, dead spheres due to the auto-acceleration effect, which might otherwise extinguish monomer-to-polymer conversion.

In a continuous process (for a batch process see the discussion of FIG. 7 below) HIPE is introduced through the axial HIPE feed port 1 at the impeller axis of rotation a-a while the impellers 2, 3 are counter-rotating about the axis a-a. Momentum from the impellers diffuses through laminar boundary layers 5 of aqueous phase against the impellers, and between the boundary layers is a shear layer 6 where the HIPE concentrates because the aqueous phase slips over the more viscous oil phase in the shear layer 6. The azimuthal advection (oppositely about the axis a-a) of the boundary layers 5 shears the HIPE in the shear layer 6. The HIPE is also stretched radially outward by its contact with the boundary layers simultaneously as the emulsion is sheared by the azimuthal advection of the boundary layers, and by HIPE foam strips 9 being extracted from the reactor.

The HIPE, which may be very delicate as it polymerizes, does not tear and its internal elastic stresses are relieved by gentle stretching. Due to viscosity and inertia, the emulsion is in radial tension: its viscosity resists its outward advection by the impellers and any pull on the HIPE foam strips 9, so the HIPE experiences a radially inward force seeking to snap it back into the axis of rotation a-a. Stretching parallel aligns emerging polymers so they do not ball up. Parallel alignment of polymers is good for cross-linking and complete polymerization of the monomer.

The HIPE foam may be extruded in orthogonal flow as a continuous sheet, and the sheet may be formed into a seamless tube. For example, a HIPE shear reactor such as shown in FIG. 1 (but without the dividers 7) could be positioned inside and at the top of a pipe and the HIPE foam extruded would coat the pipe inside (e.g., as the pipe is raised). Pipes lined in this fashion would be protected from corrosion and insulated.

Figure 5:
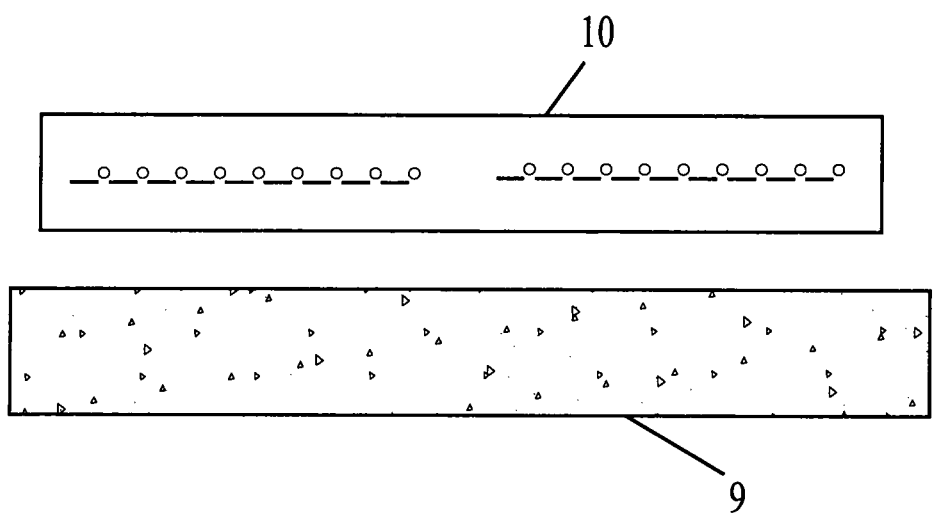
FIG. 5 shows a detail of an emulsion strip being cured by a Tesla antenna after being extracted from the periphery of the reactor.

For HIPE foam strips, dividers 7 which are disposed around the periphery 8 of the workspace and are separate therefrom divide the orthogonal flow of HIPE into HIPE foam strips 9. FIG. 1 shows two dividers 7, but there may be more than two, depending on the width of strips desired. The dividers 7 may be of various designs, such as blade wheels (like pizza cutters) turned by a motor. The blades of the dividers are oriented radially about the axis a-a such that their edge cuts through the HIPE foam as HIPE foam strips 9 are pulled out of the reactor by the friction of the blade wheels. Further processing of the HIPE foam strips 9 might include RF curing outside of the reactor by an additional inductor 10 such as a Tesla antenna, as shown in FIG. 5.

The emulsion flows radially outward in flow orthogonal to the axis a-a (orthogonal flow) in a shear layer 6, and the agitation serves to bring monomers to evolving polymer chain ends and improves the monomer-to-polymer conversion rate. The auto-acceleration effect is avoided because any heat concentration is dissipated by the forced flow of convective aqueous phase over and through the emulsion. Cross-linking and chain growth is accelerated by mechanically forced turbulence exposing and agitating active free radical ends for frequent collisions, and a high Tg polymer sheet can be continuously produced at a high monomer-to-polymer conversion rate.

In the illustrated embodiment, the HIPE feed for the reactor is produced by mixing an oil phase and an aqueous phase by suitable means known to the art before being introduced to the reactor through the HIPE feed port 1.

Additional aqueous (internal) phase might be introduced to the reactor through an aqueous phase port 11, as well as around the feed port 1, and through pores (not shown) in the impellers 2, 3 to be sure to have a sufficient a laminar boundary layer 5 of aqueous phase (whether from the HIPE or additional aqueous phase) against the impellers. Said additional aqueous phase is in addition to the aqueous phase in the HIPE. The additional aqueous phase may have a different composition than the aqueous phase in the HIPE. For example, no surfactant may be present in the additional aqueous phase. The boundary layers 5 provide a slip layer which serves to prevent the HIPE from tearing during orthogonal flow. For very gentle orthogonal flow of HIPE, the impellers could be widely separated. In one embodiment, the aqueous phase comprises initiator so that, as the aqueous phase advects the HIPE the surface of the emulsion in the shear layer the HIPE is continuously bathed by initiator to start polymerization at the HIPE surface. The boundary layers 5 also provide a forced convection bath for carrying away heat from exothermic reactions in the emulsion, thereby removing local heat concentrations in the HIPE which might otherwise promote the auto-acceleration effect.

Elastic stress in the polymerizing oil phase, the elastic stress due to said continuous simultaneous radial and azimuthal tensioning, keeps the polymer evolving ends free and thereby aids in avoiding the auto-acceleration effect. Said elastic stress dissipates localized elastic stresses which may be present in the HIPE feed when it is introduced. Elastic stress parallel-aligns structures having a high aspect ratio, such as carbon nanotubes, so they are more likely to join by van der Waals forces into rope or yarn in a matrix of polymer.

In one embodiment, the impellers 2, 3 are formed of non-conductive material. Non-conductive impellers will not shield the emulsion in the shear layer 6 from the electromagnetic fields of the RF inductor 10. In another embodiment, one or more of the impellers 2, 3 are formed of sintered metal, which is firm and yet porous enough for introducing additional aqueous phase.

Residence time in the reactor may be adjusted by varying the impeller rotation speed, impeller diameter, feed flow, and the rate of pulling the HIPE foam strips 9 out of the reactor. Experimentation by those skilled in the art will discover the appropriate settings for particular HIPE foams.

Counter-rotation of the impellers produces a continuous wash of gently shearing aqueous phase over the HIPE exterior, which extracts heat from the HIPE by forced convection.

In one embodiment, the aqueous phase is a conductive fluid and conductive particles, in one embodiment carbon nanotubes, are mixed with the oil phase. The resulting HIPE nanotube composite can be subjected to near field RF induction by an inductor 10 which Joule heats the aqueous phase (to aid in curing the polymer matrix) and joins together the ends of carbon nanotube segments by microhammering to form a conductive foam. See the discussion of FIG. 6 below.

Figure 3:
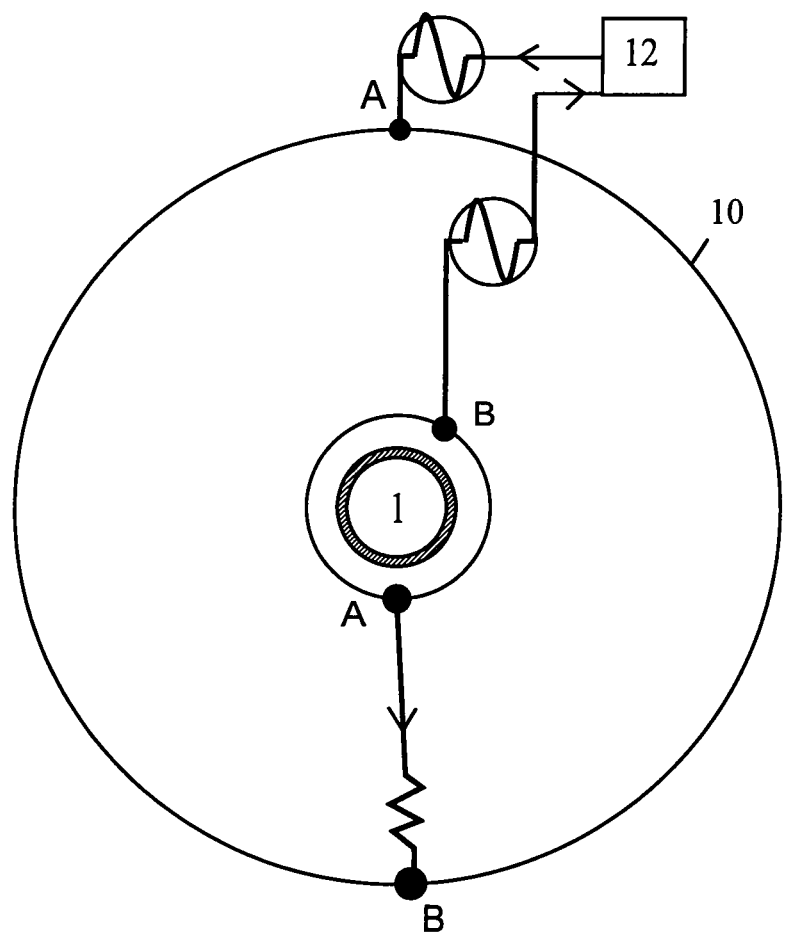
FIG. 3 shows a detail of the RF inductor, a Tesla antenna.

An inductor 10, for example a bifilar pancake coil operated at radio frequency (Tesla antenna) according to U.S. Pat. No. 512,340 to Tesla (1894) [see FIG. 2 thereof] is disposed approximately parallel to the emulsion, as shown in FIG. 1. A detail of the inductor 10 is shown in FIG. 3. The Tesla disclosure is incorporated by reference herein. Other inductor designs are included within the term inductor herein, including inductors operating at frequencies higher or lower than the radio frequency spectrum. The inductor 10 couples electromagnetic energy into the emulsion, both into the conductive aqueous phase and also into the conductive particles mixed with the oil phase. Radio frequency Joule heating cures the HIPE gently from the inside. Curing the polymer completes polymerization and cross-linking and forming the nanostructure my microhammering gives the HIPE foam structural strength sufficient to allow for its extraction from the periphery by the dividers 7.

The induction at radio frequency is a near field effect, i.e., the emulsion is within one RF wavelength of the inductor. For example, the wavelength of a 100 MHz inductor is 3 meters in free space, and in water (refractive index 1.333) the light speed in water is $225 \times 10^3$ m/s. The light speed in polycarbonate (refractive index 1.586) is $189 \times 10^3$ m/s. The wavelengths of electromagnetic radiation in water at 100 MHz is 2.25 meters and in polycarbonate 1.89 meters. For 5 MHz, the wavelengths are 20 times longer, or enough for most industrial applications.

The skin depth of seawater (conductivity 4 S/m) at 5 MHz is approximately 10 cm, which may serve as a guide to the appropriate inductor frequency for a particular reactor geometry and aqueous phase conductivity. Joule heating of the conductive aqueous phase in the small cells of the foam accelerates the polymerization of the oil phase at the interstices of the cells. It also pumps energy into the boundary layer of aqueous phase which separates the emulsion from the impeller, thereby evenly heating the surface of the emulsion so the surface toughens by rapid polymerization before being extruded from the reactor at the periphery 8.

A suitable inductor 10 may be Tesla's bifilar pancake coil antenna or other designs known to the art. See the discussion of FIG. 3 below. Tesla's inductor design allows for radio frequency operation at minimal loss. Radio frequency operation is good because high frequency is good for inductive effect. However, higher frequency operation than the RF spectrum, such as microwave, would run into the skin depth problem, where most of the energy is dissipated in the polycomposite at a shallow depth so the energy concentration at the surface of the polycomposite is undesirably high. The term inductor 10 as used in the claims includes inductors operating at higher or lower frequencies than RF.

In the embodiment shown in FIG. 1, the inductor is centered on the axis a-a of the shear reactor such that the emulsion passes under the inductor during its radial flow to the periphery 8. FIG. 5 shows an inductor 10 used to cure HIPE after it has been extruded from the shear reactor.

The RF frequency fluctuating magnetic field lines of the inductor induce currents in conductive particles of the HIPE, by Lenz's law. Within the term conductive particles are included carbon nanotubes (whether metallic or semiconductive), anode grade coke, gold flakes, aluminum flakes, silver flakes, and wires, fragments, and powders of metals. It also includes cations. The foregoing enumeration is not meant to be restrictive, and the term conductive particles is intended to be broadly inclusive to any substance having a conductivity greater than the conductivity of the monomer in the oil phase.

Each conductive particle carries an induced transient current which creates a magnetic field opposed to the inducing field (Lenz's law), and therefore a repulsive force accelerating the particle away from the inductor 10. At 5 MHz, the inductor delivers 5 million impulses each second. The term "microhammering" for the >1 million per second barrage is preferred because as a micron is a millionth of a meter, a millionth of a second is a microhammer frequency. The term microhammering has been used in other contexts, such as audio frequency physical hammering of gold, but those limitations from the term's previous use are not intended to limit the scope of the claims herein. Microhammering may also occur at frequencies greater or less than 1 MHz, and such induction is also covered by the claims.

The transient anodes and cathodes at the nanotube ends, which alternate at radio frequency and arise because the nanotubes in the HIPE foam are being microhammered by the inductor 10 (see FIGS. 6a-6c), electrolyze polymer between them and accrete the resulting carbon ions at their ends, which are cathodes half the time. The nanotube ends are kept from capping and the ends are eventually spliced together into a nanostructure as the microhammering continues. Another benefit of said nanotube end electrolysis is that the material between the nanotube ends is weakened, so the nanotubes can punch through the polymer matrix and join ends.

Depending on the concentration and character of conductive particles, the HIPE foam may be as conductive as an equivalent weight of conventional conductors, such as copper, silver, gold, and aluminum. EM shielding and grounding of HIPE nanotube composite should be excellent.

The HIPE foam comprising nanotubes can be referred to as a nanocomposite polymer foam, and connected nanotubes in it are referred to as nanostructures. The nanocomposite polymer foam disclosed herein can have high tensile strength and resiliency, due to the nanotubes embedded in its structure, and also good vibration damping, due to the sponge-like network of polymer. If the HIPE foam comprises urethane or other polymer having low coefficient of restitution, especially good damping characteristics can be obtained. Nanocomposite polymer foam can therefore be good for tennis racquet frames or other impacting items: the nanostructure provides stiffness, and the low coefficient of restitution polymer in the foam absorbs shock in stretching the polymer and dissipates the energy load as heat.

FIG. 2 shows a detail of the top impeller 2, looking from the inside of the reactor toward the feed port 1. A radial array of runners 4 curves away from the direction of rotation, shown by the arrow. The axis of rotation is at the center of the impeller 2. Each impeller has the same array, so when the impellers are disposed coaxially and in parallel, the runners 4 on the opposed impellers 2, 3 scissor as they counter-rotate. The spaces between the runners allow for continuous forced convection of heat out of the HIPE.

FIG. 3 shows a detail of the inductor 10, embodied as a Tesla antenna as disclosed in Tesla, U.S. Pat. No. 512,340 (1894), which disclosure is incorporated herein by reference. The inductor is disposed above the top impeller 2 and is centered on the feed port 1, as shown in FIG. 1. This is a bifilar pancake coil operating at radio frequency, which is supplied by a radio frequency electromagnetic source 12. Radio frequency is preferred to higher frequencies, such as UV, because skin depth of RF is greater and therefore inductive effect can penetrate deeper into the HIPE, therefore the energy from the inductor is not dissipated so much in the conductive aqueous phase before getting to the nanotubes in the polycomposite.

Current from the source 12 flows as shown by the arrows. The Tesla antenna comprises two coils in series, having their interleaved parallel filaments wound together in a flat spiral such that current flows in the same direction in adjacent windings. Other bifilar coils wound in a different manner may have current flowing in opposite directions in adjacent windings, and such configurations as well as other inductor types are also included in the definition of the inductor 10, although the Tesla antenna is the preferred embodiment of the inductor 10.

In operation, current flows from the source 12 to a first coil (not shown) having its endpoints denoted by A. The current spirals inward in said first coil to the termination A, thence from A in a radially outward jumper cable to the beginning of a second coil, having its endpoints denoted by B. The second coil also spirals inward, having its windings interleaved with the first coil. There is an approximately equal length of conductor between any pair of adjacent filaments, and the conductor has some resistance, so adjacent windings of the first coil and the second coil therefore have a potential between them. Parasitic capacitance allows for high frequency operation by offsetting inductive reactance.

Tesla offers the following example to show that the Tesla antenna allows for high energy storage: a conventional coil of 1000 turns having a potential of 100 volts across its terminals will have a 0.1 volt potential between turns. In the Tesla antenna, there is a 50 volt potential between adjacent windings due to the interleaved windings of the two coils in series. Energy storage in a capacitor is proportional to the square of the voltage, so the Tesla antenna will have $50^2/0.1^2=250,000$ times the capacitance of the conventional coil in this example.

Figure 4:
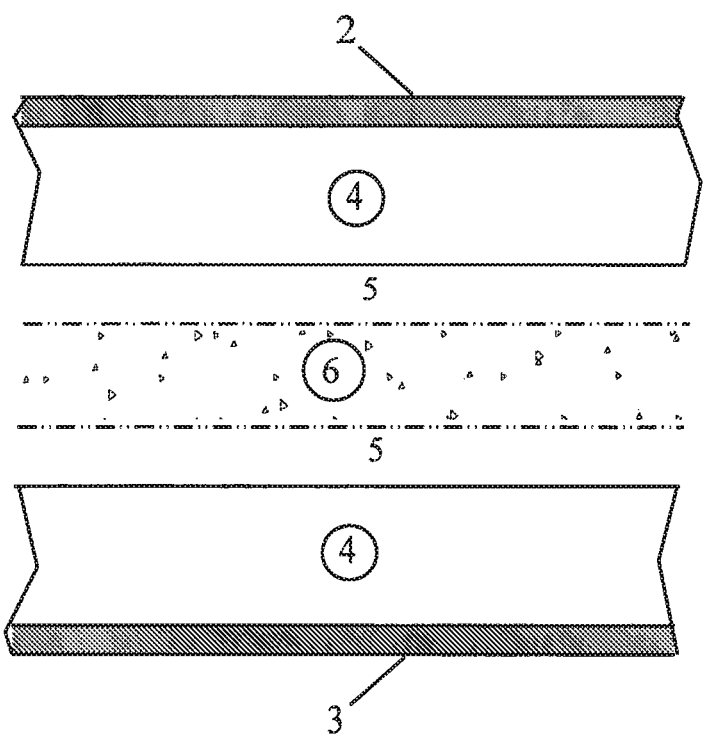
FIG. 4 shows a detail of a cross-section of the emulsion as it is being sheared between the boundary layers and bombarded with RF from the inductor.

FIG. 4 shows a detail of the space between the impellers 2, 3 as the impellers counter-rotate. Laminar boundary layers 5 of aqueous phase are against the impellers. Between the boundary layers is a shear layer 6, wherein is the HIPE. Runners 4 on the impellers advect the boundary layers 5, and thereby indirectly advect the shear layer 6. Orthogonal flow of HIPE is radially outward from the axis a-a (not shown, see FIG. 1).

FIG. 5 shows a HIPE foam strip 9 including conductive particles (e.g., nanotubes) therein, also referred to herein as a polycomposite strip, being microhammered by a Tesla antenna. RF curing completes the monomer-to-polymer conversion and also microhammers the conductive particles in the polycomposite strip 9. Heating of the polymer matrix occurs very locally at the tiny nanotube ends, unlike the 900°-1300° C. bulk heat annealing process disclosed in Smalley et al. U.S. Pat. No. 6,790,425 (2004), which would disintegrate the matrix.

A useful analogy for microhammering a nanotube polycomposite is the traditional blacksmith's setup: an anvil provides reaction to the hammer blows, and tongs hold the workpiece in place as the blows are delivered. The foam performs the function of the anvil and tongs, and the Tesla antenna is the hammer.

The elasticity of the polymer foam matrix strips 9 shown in FIG. 5 is not so high as to prevent the nanotubes from changing orientation in response to microhammering, yet not so low that the nanotubes are driven out of the matrix. The polymer has a high enough coefficient of restitution so the matrix rebounds from the impulse due to Lenz's law and delivers the nanotube for another microhammer blow. Over time in the consistently aligned alternating magnetic field of the inductor, the nanotubes in the polycomposite, which are already in approximately parallel alignment due to shear and tension in the polymer, join ends as shown in FIGS. 6a-6c.

Conductive particles mixed with the aqueous phase are microhammered to deposit against the oil phase, where the cannot move away from the inductor, so they heat the aqueous phase and the surface of the oil phase, thereby locally enhancing the available energy for initiation of polymerization at the surface of the cells and of the emulsion. Conductive particles mixed with the oil phase are also unable to move away from the inductor 10, so they internally heat the oil phase and add activation energy for polymerization.

Induced currents in the conductive particles cause them to aggregate into larger conductive structures. Parallel currents attract, so carbon nanotubes, which have a very high aspect ratio (length/diameter) and are very stiff and very conductive, adjust their position in the HIPE. Each nanotube transiently has a cathode end and an anode end (see FIG. 6b), which are due to the induced current direction and which reverse at a frequency according to the frequency of the inductor 10. Each cathode end accumulates carbon ions to extend the nanotube. The carbon ions might come from vaporized-then-ionized non-metallic nanotubes, which have higher resistance than metallic nanotubes, or from the polymer matrix as molecular bonds are broken by the high electric field at the tiny ends of the nanotubes. Continued RF induction knits the nanotubes into a conductive network which gives bulk conductivity to the HIPE foam.

Figure 6A:
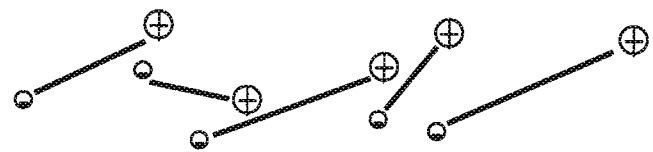
FIG. 6*a-c* shows carbon nanotubes being joined at their ends by microhammering.
Figure 6B:
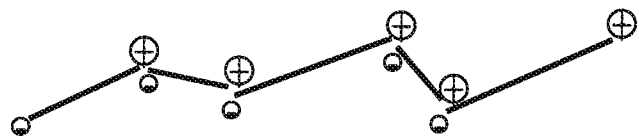
Figure 6C:

FIGS. 6a-6c show microhammering of nanotubes. The magnetic field lines of the inductor 10 (not shown, see FIG. 5) are parallel to the page and vertical, so the eventual orientation of the welded nanotube is orthogonal to the magnetic field lines. The induced currents are orthogonal to the magnetic field lines.

FIG. 6a shows a group of loosely aggregated carbon nanotubes in the oil phase. Some degree of parallel alignment is present as shown in FIG. 6a, due to shear and tension in the polycomposite wherein the nanotubes are held in a matrix of polymer. Induced currents caused by the inductor 10 result in one end of each nanotube becoming a transient anode and the other end becoming a transient cathode, as indicated by the signs at the ends.

In FIG. 6b, continued RF induction (microhammering) has caused the nanotubes to shift due to their end charges attracting. In FIG. 6c, a long nanotube has been aggregated from the segments shown in FIGS. 6a and 6b. Heat annealing as disclosed in Smalley et al. U.S. Pat. No. 6,790,425 (2004) is improved by making the heat effect on the polymer very local, so as to preserve the polymer matrix. Nanotubes, like diamonds, are very efficient conductors of heat, so the heat from nanotube induction in microhammering will affect the polymer matrix mostly at the ends of the nanotubes, thus vaporizing and ionizing the polymer matrix between the ends of nanotubes so as to provide a carbon ion feedstock for completing the link between the nanotube ends. The polymer preferably has low thermal conductivity, so convection into the bulk of the matrix is minimal, and the matrix is preserved even as the conditions at the nanotube ends become extreme.

Hemispherical capping of nanotube ends, which would terminate them, is overcome by the microsecond-frequency switching of currents in the nanotube. Microhammering keeps the evolving nanotube ends open so that carbon nanotubes can link into macroscale nanostructures.

Although discussion has focused on near field RF induction of a thermoset nanocomposite foam by a Tesla antenna, that is only one embodiment of the microhammering process. Carbon nanotubes mixed with thermoplastics and extruded through spinnerets like nylon to parallel-align the nanotubes which are subsequently microhammered into nanostructures in a rod of solid plastic are another example. Carbon nanotubes microhammered on the surface of a substrate such as polycarbonate film are another. Many other examples may be found based on the disclosure herein, and are intended to be covered by the claims. Therefore the term "matrix" is used in the claims, which term includes any material used to hold the nanotubes in place during microhammering.

Figure 7:
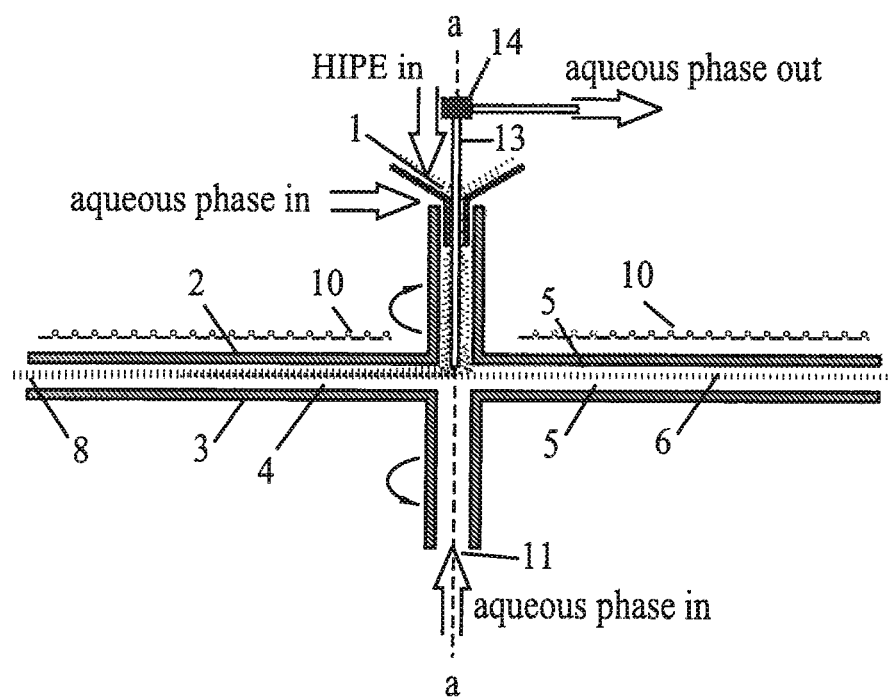
FIG. 7 shows an alternative embodiment, for processing HIPE into a radial filter.

FIG. 7 shows an alternative embodiment of the shear reactor for batch processing to produce HIPE foam disks having capability as radial filters. FIG. 8 is a detail of the HIPE feed port. The device is submerged in and surrounded by a tank (not shown) filled with aqueous phase.

HIPE is introduced through the axial feed port 1 in a batch, as shown in FIG. 8 with more particularity. As the impellers rotate about the axis a-a in opposite directions (counter-rotation) the HIPE is sheared, and shear creates an array of radial vortices at many scales, in a tree network. Additional aqueous phase is introduced through the port 11, to maintain the level of the tank in which the reactor is submerged. Additional aqueous phase in the surrounding tank also permeates the impellers 2, 3 to keep them clear of oil phase. The additional aqueous phase may be deionized water.

An array of radial vortices branches fractally into very fine scale eddies toward the periphery 8. The eddies form very small cells in the foam by viscous diffusion of momentum in the oil phase, and by gelling these small cells are fixed in place. The aqueous phase spinning in these eddy vortices is trapped in vortex cores because it is Newtonian fluid and flows easily. The more viscous oil phase in these turbulent eddies of the emulsion does not flow easily, so it is rejected by the vortex cores and concentrates at the interstices between the eddies, where it hardens. The aqueous phase in the vortex cores washes over the hardening oil phase interstices and carries off the heat from exothermic reactions, to prevent the auto-acceleration effect.

An axial extraction port 13 is disposed within the HIPE at its center. FIG. 8. shows a detail of where the axial extraction port is positioned relative to the flow of HIPE into the reactor. The axial extraction port 13 comprises at least one central conduit, the conduit communicating with an axial extraction pump 14. In FIG. 8 the HIPE being fed to the reactor is shown flowing around this central conduit. The axial extraction port 13 may comprise a radial array of tubes communicating with a central conduit. Flow through the axial extraction port and out of the reactor is forced by the axial extraction pump 14. Additional aqueous phase flows from the tank, in which the reactor is submerged, through the hardening HIPE radially inward through the hardening fractal vascular network (the radial vortex cores) to the axis a-a and out of the reactor through the axial exhaust port 13. The radially inward flow at least partially flushes surfactant out of the HIPE as cells connect into vortices and the vortices connect into a fractal network for sink flow to the axis a-a.

An area-preserving vascular network sets up by open von Karman swirling flow in the HIPE. Fine-scale vortices at the periphery 8 converge to larger-scale radial vortices as convergent sink flow is forced toward the axis a-a by the suction of the axial extraction pump 14. Although the viscosity of the introduced HIPE is approximately the same as that of the aqueous phase, at first, the hardening polymer in the HIPE becomes more viscous, so the HIPE cannot flow as readily as the aqueous phase, therefore oil phase is not removed from the axial extraction port 13. In batch mode operation to form foam disks, the HIPE is introduced to the workspace and allowed to spread slowly outward to the periphery 8 in the shear layer 6, and the axial extraction pump 14 is actuated when the HIPE has gelled sufficiently to prevent convergent flow toward the axis a-a of the more viscous oil phase, and radial vortices formed in the gelling HIPE allow for a steady convergent flow into the axial extraction port 13 of aqueous phase only.

Axial extraction of aqueous phase through the axial extraction port 13 provides forced convection for removing heat from within the HIPE. The forced radially inward flow of aqueous phase, due to the axial extraction pump 14, occurs as the HIPE is being sheared between the boundary layers 5. When the HIPE has hardened sufficiently, it is removed from the reactor through the periphery 8 by suitable means (not shown), clearing the reactor for processing a new batch for a new radial filter.

The formation of an array of radial vortices in the HIPE, the radial vortices having axes of rotation which point toward the axis a-a, is due to the shear between the impellers, particularly the shear between their arrays of runners, shown in FIG. 2. The runners scissor together as the impellers counter-rotate, and the scissoring points of intersection of the runners are on a straight line radially outward from the axis a-a. The shearing and stretching along these lines imparts vorticity to the HIPE, and by this forcing in combination with the suction of the pump 14 vortices set up where aqueous phase droplets can coalesce into coherent sink flow channels through a radial fractal vortex network.

When the HIPE hardens, the sink flow channels are preserved and the HIPE disk is a radial filter having optimal radial flux because of its area-preserving character. Stacks of such HIPE foam disks would provide improved radial filtration because the pores at the periphery are small and the radially inward flow of filtrate goes through an area-preserving network. A rotating stack of such radial filters would reject particles due to the shear-lift effect, and would have high flux due to the area-preserving character of the vascular network in the filter.

Trees have a vascular network which is area-preserving: the cross-sectional area of the conductive tissue of the trunk is equal to the sum of the cross-sectional areas of the rootlets, so flow through the network is as if through a constant diameter pipe. See Chen, et al. "Fractal-like tree networks increasing the permeability," Physical Review E 75, 056301 (2007).

An inductor 10 may assist curing in the reactor and alignment and joining of carbon nanotubes, as discussed above. Microhammering under the present disclosure, by means of a Tesla antenna or other suitable means for induction at radio frequency, would link nanotubes in the vortices of the foam into a radial array of helices. Each helical nanotube conductor thus formed would have an axis orthogonal to the axis a-a. Helices formed of other conductive materials by microhammering, such as nanowires of gold, are also included within the claims.

Numerous exemplary embodiments have been disclosed above. What follows in the paragraphs below is a non-limiting discussion of some of the embodiments disclosed above.

In one embodiment, a HIPE is axially fed between counter-rotating coaxial centrifugal impellers while a boundary layer of aqueous phase against the impellers diffuses momentum from the impellers to the HIPE, thereby causing orthogonal flow of HIPE radially outward between the boundary layers. Gentle stretching of the HIPE by the impellers and circulation of aqueous phase over and through the HIPE prevents the auto-acceleration effect and aids monomer to polymer conversion and crosslinking of polymers. Stretching also serves to parallel-align included carbon nanotubes so that they might join into ropes or yarn by van der Waals forces.

In one embodiment, a Tesla antenna induces transient currents in conductive fractions mixed with the HIPE. In one embodiment, the oil phase of the HIPE comprises carbon nanotubes and the Tesla antenna is operated at radio frequency. The nanotubes acquire charge separation, and their ends become electrodes coupling energy into the monomer or polymer between the nanotube ends. The matrix between the nanotube ends disintegrates, contributing carbon ions to bridge the gap between the nanotube ends. Joule heating by RF induction of the HIPE assists curing.

In one embodiment, carbon nanotubes in a monomer matrix are parallel-aligned by shear and stretching of the monomer, the monomer polymerizes, to fix the nanotubes in a firmer matrix, and then the carbon nanotubes are joined at their ends by microhammering under an RF Tesla antenna to form a nanostructured polycomposite which has high conductivity for its weight. In one embodiment, the nanostructured polycomposite is in the form of a foam obtained from a High Internal Phase Emulsion (HIPE).

A radial filter having improved convergent sink flow from its edge to its center (radial flux) due to a fixed area-preserving vascular network in a HIPE foam is produced by batch processing in a shear reactor according to the present disclosure. Such a polycomposite foam containing carbon nanotubes spun around the radial vortices which create the vascular network, the nanotubes connected in a conductive nanostructure, would be a radial array of highly conductive and resilient coils.

While the embodiments of the present invention have been particularly shown and described above, it will be understood by one of ordinary skill in the art that various changes in form and details may be made therein without departing from the spirit and scope of the present invention as defined by the following claims.

What is claimed is:

1. A method of forming a nanostructure, comprising:
   dispersing nanotubes in a matrix material, wherein the nanotubes comprises carbon nanotubes and the matrix material comprises carbon;
   inducing currents in the nanotubes;
   ionizing the matrix material at ends of the nanotubes, wherein ionizing the matrix material at the ends of the nanotubes includes:

electrolytically separating portions of matrix material located between oppositely charged ends of the carbon nanotubes; and providing carbon ions for nanotube growth.

2. The method of claim 1, wherein the frequency of the currents is in the radio frequency range.

3. The method of claim 1, wherein the matrix material comprises at least one selected from the group consisting of a thermoset polymeric material, a thermoplastic material and a ceramic material.

4. The method of claim 1, wherein the matrix is a foam that includes high internal phase emulsion (HIPE) foam.

5. The method of claim 1, wherein the matrix is a monomer.

6. The method of claim 1, wherein the matrix is a polymer.

7. The method of claim 1, wherein the matrix is thermoplastic extruded through spinnerets.

8. The method of claim 1, wherein the carbon nanotubes a positioned on the surface of the matrix.

9. The method of claim 1, wherein the frequency of the currents is in the microwave frequency range.

10. The method of claim 1, wherein the ionizing the matrix at the ends of the nanotubes causes the nanotubes ends to extend.

* * * * *